UNITED STATES PATENT OFFICE.

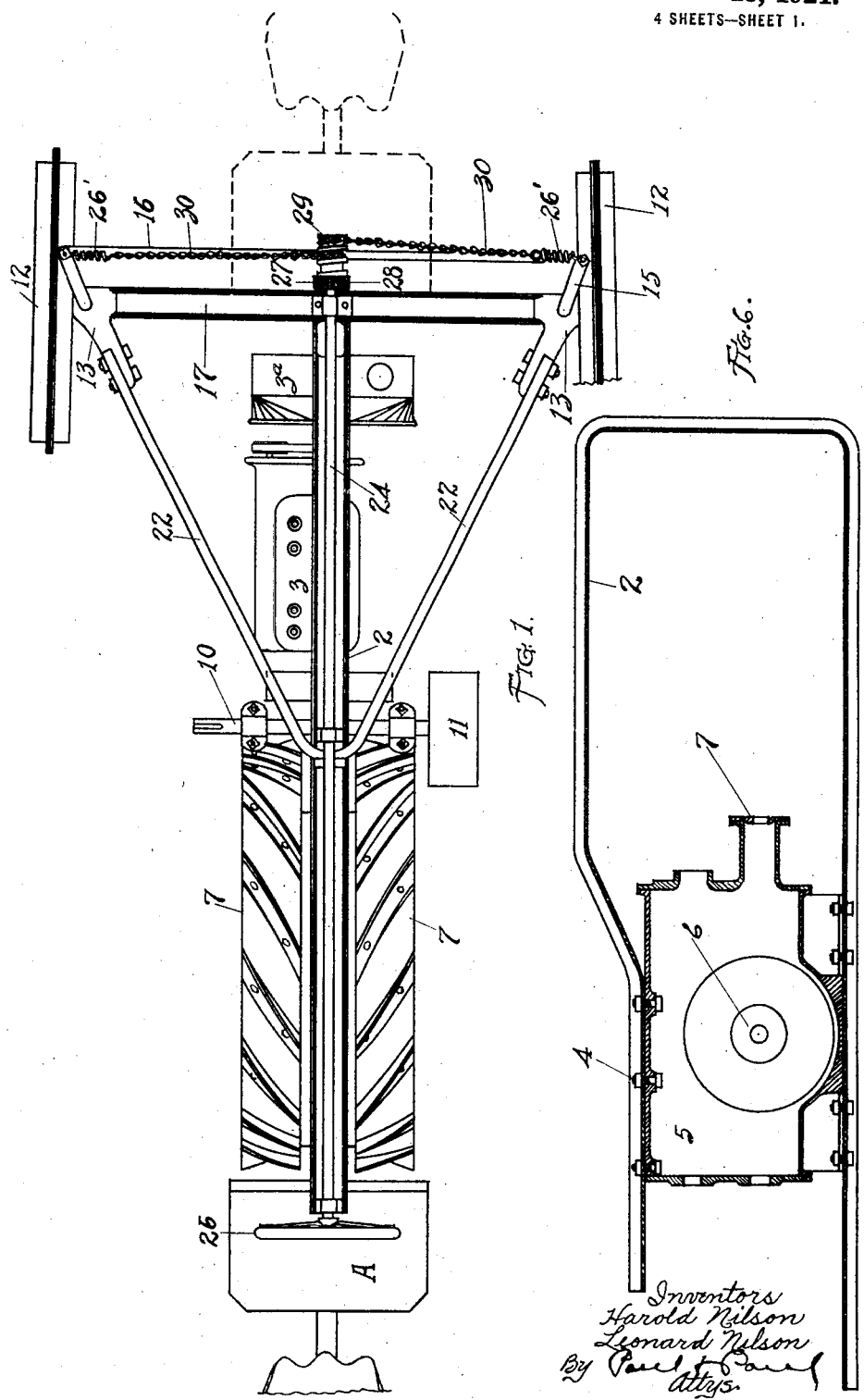

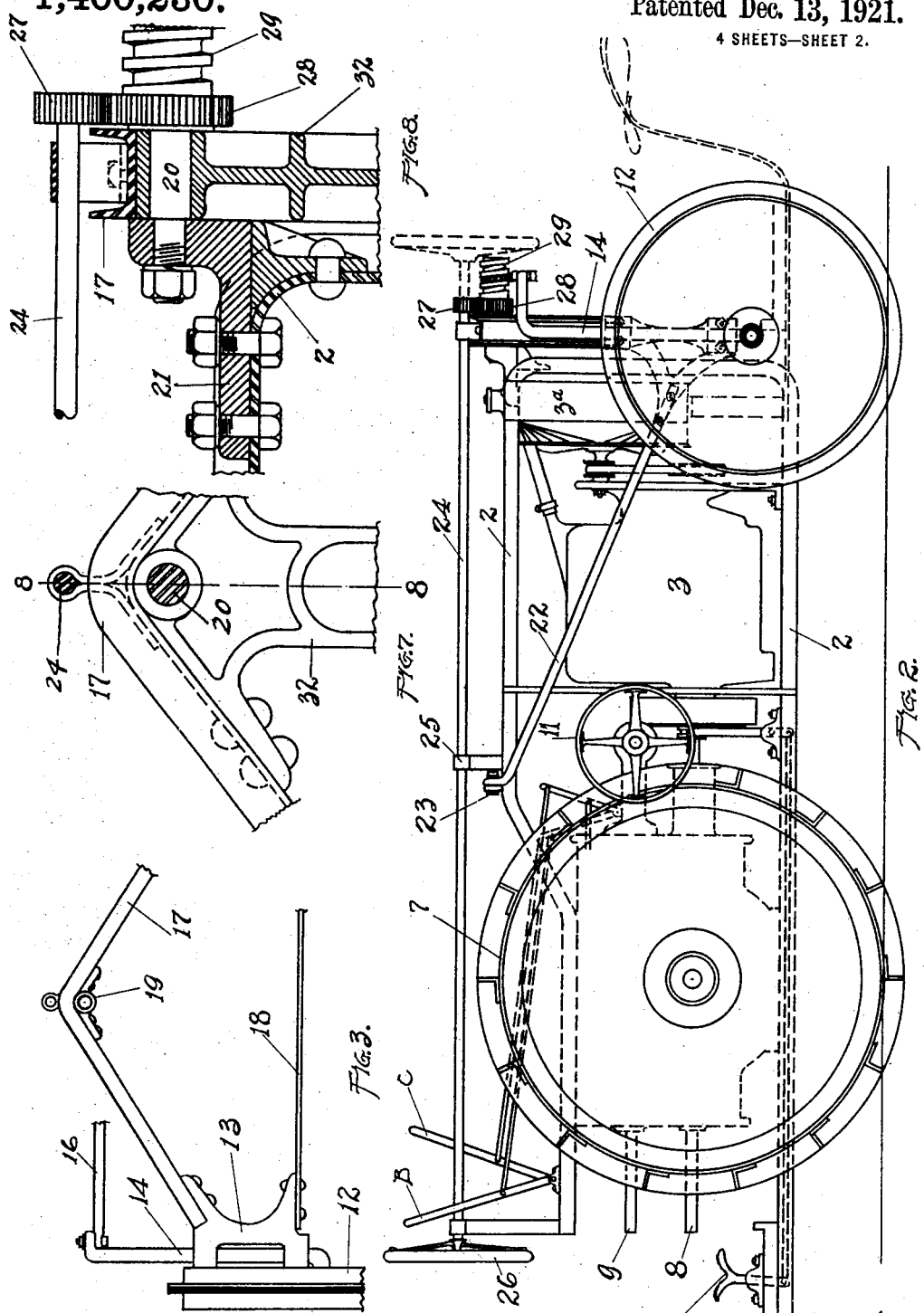

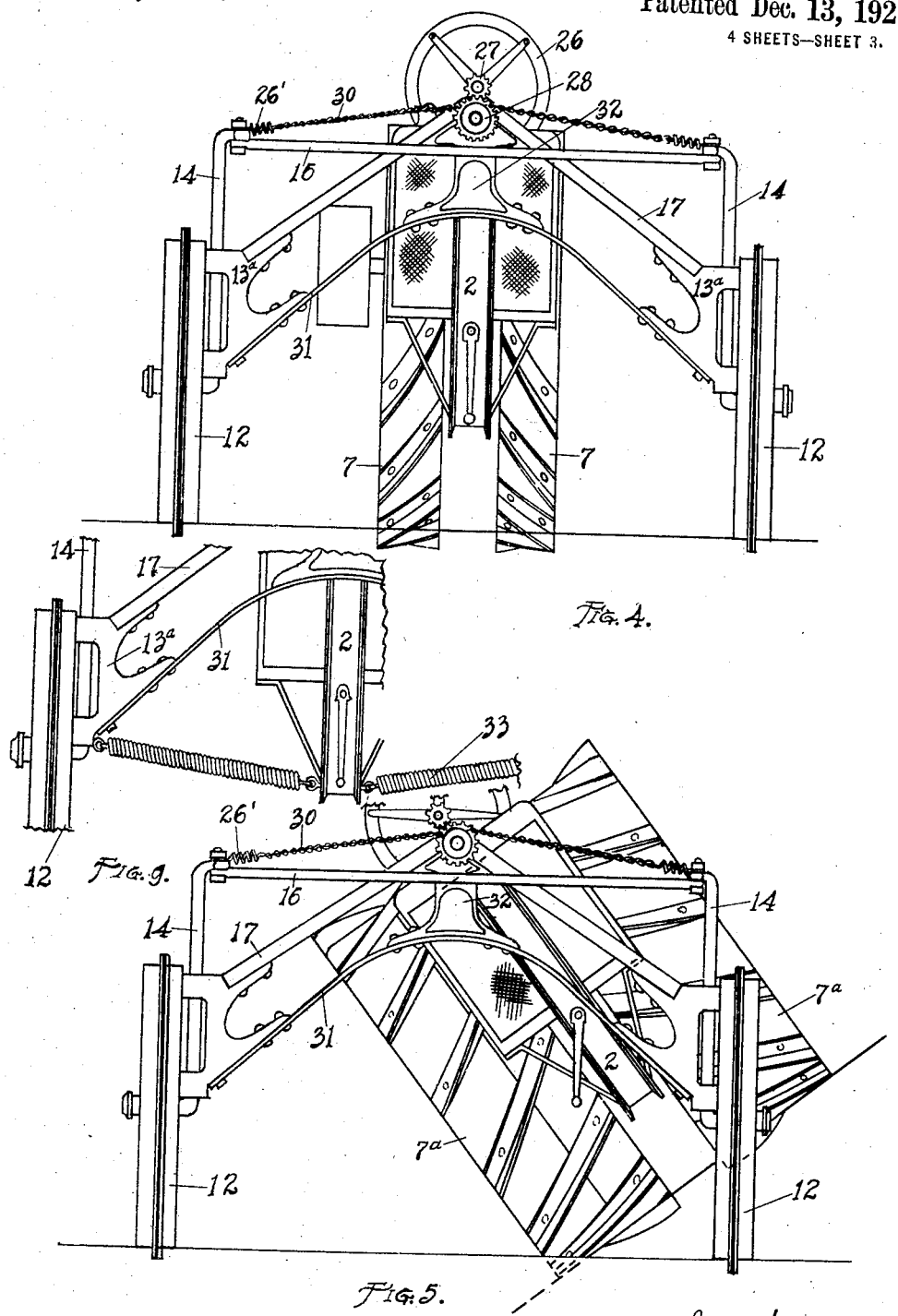

HAROLD NILSON AND LEONARD NILSON, OF WAYZATA, MINNESOTA.

TRACTOR.

1,400,230.　　　　Specification of Letters Patent.　　Patented Dec. 13, 1921.

Application filed October 29, 1918. Serial No. 260,202.

*To all whom it may concern:*

Be it known that we, HAROLD NILSON and LEONARD NILSON, citizens of the United States, residents of Wayzata, county of Hennepin, State of Minnesota, have invented certain new and useful Improvements in Tractors, of which the following is a specification.

The object of our invention is to provide a tractor capable of general use wherever a traction machine may be employed and particularly designed for use on side hills or uneven ground where the guide wheels or the traction wheels are frequently upon different levels.

A further object is to provide a tractor adapted for plowing or for cultivating between the rows of plants.

A further object is to provide a tractor of comparatively light construction which will develop a maximum of power and can be easily and quickly handled.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a tractor embodying our invention,

Fig. 2 is a side elevation of the same,

Fig. 3 is a detail view, showing the preferred construction of the forward axle for general tractor use, Fig. 4 is a front elevation, showing the preferred form of forward axle for use on a cultivator, Fig. 5 is a similar view, showing the traction wheels provided with wider treads and illustrating the tilted or inclined position assumed by the machine frame when it is running on a hillside or uneven ground, Fig. 6 is a detail sectional view, showing the unit construction of the frame and the transmission casing.

Figure 10:
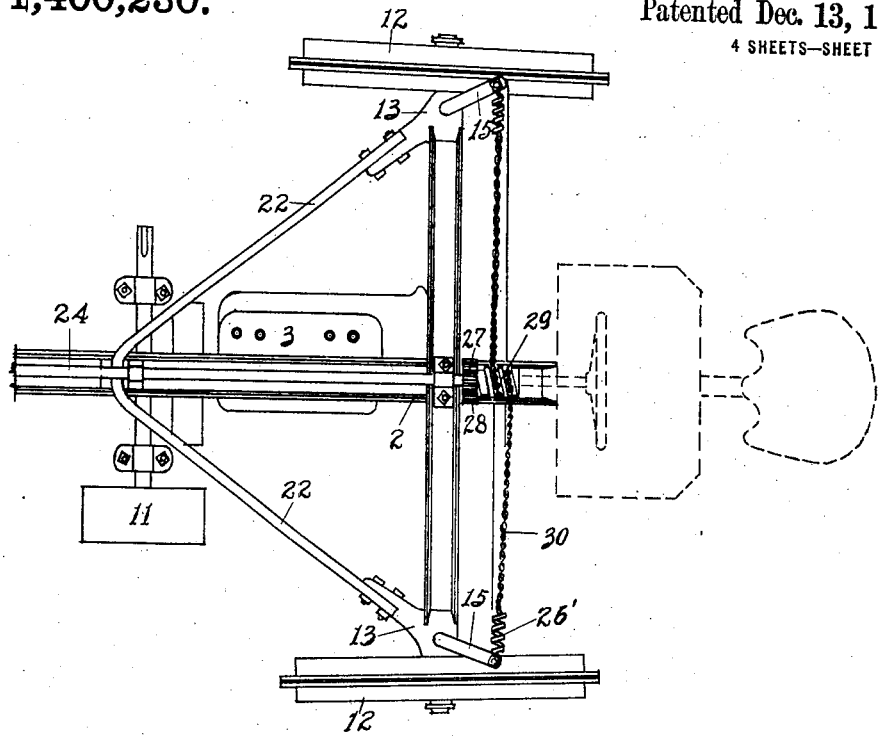
Figure 11:
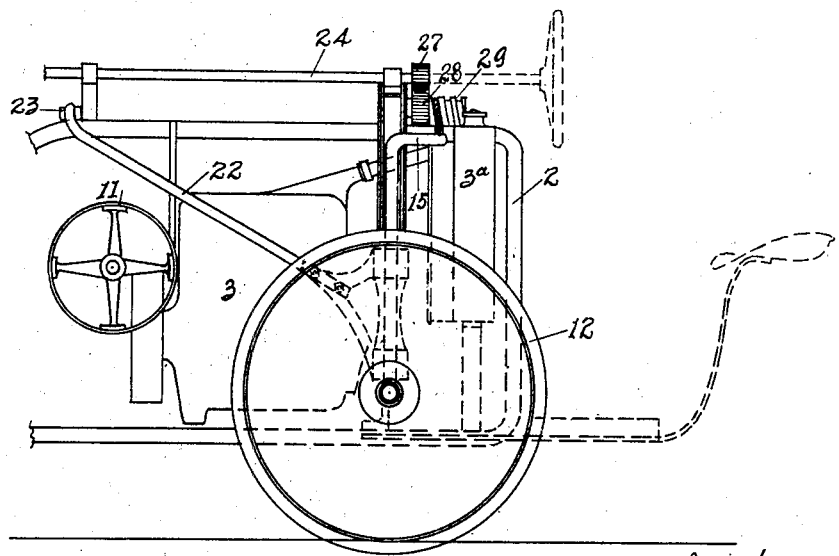

Fig. 7 illustrates a modified construction of the arch and the supporting pivot of the frame, Fig. 8 is a sectional view on the line 8—8 of Fig. 7, showing the manner of mounting the frame on the arched axle, Fig. 9 is a detail view, showing the arrangement of the springs for centering the oscillating frame between the guide wheels, Fig. 10 is a plan view, showing the radiator of the engine mounted in front of the forward axle to provide a shorter wheel base, Fig. 11 is a side elevation of the same.

In the drawing, 2 represents the frame of the machine, made preferably of channel bars, but instead of mounting this frame in a horizontal plane, as usual in tractors, we arrange it in a vertical plane or on edge, so that one side rail, instead of being parallel with and on a level with the other rail of the frame, is above it on a higher level. This arrangement provides a narrow frame and allows the traction wheels to be set up near together so that the machine may be operated with the traction wheels running between two rows of plants for cultivating purposes. By mounting the frame in a vertical plane we are able to provide for the desired lateral oscillation without the necessity of increasing the normal distance between the guide wheels. Whenever it is desired to increase the traction, the traction wheels may be made wider by the addition of the rim sections, as will hereinafter appear.

The lower rail of the frame is arranged a suitable distance from the ground and between this rail and the upper one at the forward portion of the machine we prefer to arrange the motive power, consisting of an internal combustion engine 3 of any suitable type and of the desired horse power. This engine is securely bolted in place between the rails of the frame. In the rear of the engine and also secured to the frame by bolts 4 or other suitable means, is a transmission casing 5 in the form of a casting secured at the top and bottom to the rails and forming therewith a portion of the frame of the machine. This casting has a bearing 6 for the axle of the wheels 7, and the transmission gearing is arranged within the casting 5 and has a driving connection with the axle and with the driving shaft of the engine 3, which extends backwardly from the engine through the bearing 7 in the casting 5. Shafts 8 and 9 may also be mounted in the casting 5 and driven from the engine shaft and from these shafts 8 and 9 power may be taken for any desired purpose. A shaft 10 is transversely mounted between the rails of the frame and has a driving connection with the gearing in the transmission casing and is provided with a pulley 11 from which power may be taken for running a saw or any other piece of machinery. This feature of the machine, while not adding materially to its cost or weight, adapts the tractor for various purposes around a farm.

12 represents the forward or guiding wheels, spaced a considerable distance apart to straddle several rows of plants when the machine is used for cultivating purposes, and providing ample room for the oscillation of the machine frame. 13 represents brackets and 14 are the wheel spindles having vertical bearings in said brackets and projecting preferably a considerable distance above the same. These spindles have crank arms 15 at their upper ends, pivotally connected across the machine by rigid means, such as a bar 16. The brackets 13 are connected at the top across the machine by an arched beam 17 and at the bottom by a horizontal brace bar 18, as shown in Fig. 3, this being the construction adapted for the general tractor frame or the machine used for plowing, it being unnecessary to provide in such a machine for as much clearance beneath the forward axle as in a cultivator. The top of the arch extends preferably a considerable distance above the axis of the forward wheel and of the traction wheels and in the apex of the arch we prefer to provide a bearing 19 for a pivot pin 20. A bracket 21 is bolted to the forward portion of the upper rail of the frame and is mounted on the pivot pin 20 for freedom of lateral oscillation thereon. Bars 22 are connected at their forward ends to the brackets 13 and are pivotally connected at 23 to the upper rail of the frame, the pivot 23 being concentric with the pivot 20 to allow for freedom of oscillation of the frame. These bars 22 have the function of holding the forward axle in its proper transverse relation with respect to the oscillating frame of the machine.

This construction provides for a pendulum-like movement of the main frame, the motor 3 weighting the lower portion thereof and causing the frame to swing from side to side by gravity while the pivot of the frame on the forward axle above the motor or center of gravity permits the frame to assume a vertical position, independently of the guide wheels, regardless of the character of the ground over which the machine may be moving. Normally in machines of this kind as ordinarily constructed the center of gravity of the frame and the parts connected thereby is above the connection with the forward axle and consequently when the machine is moving along a side hill or one of the wheels drops into a hole, the upper portion of the frame and the motor will immediately tilt or tip toward the low side of the machine and if the hillside is very steep, the tractor will sometimes turn over or the mechanism will be so cramped and topheavy that it will be difficult to draw a load. With our construction all this difficulty is avoided. The load on the frame is below its pivotal connection with the carrying axle and sufficient space is provided between the guide wheels to allow freedom of lateral oscillation of the frame sufficient to permit the frame to accommodate itself to any inclination over which the machine may be traveling. The traction wheels will follow the surface over which the machine is moving and will firmly grip such surface and allow the forward axle and guiding wheels to tilt to any desired angle, the frame, and traction wheels meanwhile resisting any tendency to tilt toward the low side of the machine and the center of gravity being sufficiently low to resist any tendency of the machine to tip toward the low side, whether the machine is running on a steep hill side or the wheels drop into a hole. The pivoted frame and the traction wheels will automatically assume their tilted or inclined position.

A steering post 24 is mounted in the bearings 25 in the top of the frame and is provided with an operating wheel 26 at one end and a similar wheel may be mounted at its opposite end so that the machine may be steered from either end, as desired. The forward end of the post 24 is provided with a pinion 27 meshing with a gear 28 on a screw 29 to which chains or cables 30 are connected and to the crank arms 15. These cables are so mounted on the screw that when the post is revolved one cable will be wound up on its screw and the other cable unwound therefrom a corresponding distance. This compensates for the oscillation of the spindles 14 in their vertical bearings through the connecting bar 16 between them, the pinion 27 and the gear 28 serving as a reduction gearing for rendering the steering post easier of operation for the purpose of turning the wheels 12 to guide the machine. A coiled spring 26' may be provided between the cables 30 and the arms 15 to provide a yielding connection between the steering post and the wheel spindles.

In Figs. 4 and 5 we have shown a modified construction of the forward axle, in which the bar 31 secured at its ends to the lower portion of the brackets 13ª is arched across the machine instead of extending horizontally and thereby a high clearance is provided to adapt the machine for cultivating purposes. In this construction a bracket 32 is preferably interposed between the arched middle portion of the axle 17 and the corresponding portion of the transverse bar 31 beneath and being securely bolted strengthens and braces the axle at this point. In other respects the manner of mounting the vertical frame in the axle and its lateral pressure corresponds substantially to the construction previously described.

In Fig. 5 we have illustrated rim sections 7ª secured to the wheels 7 by suitable means, and designed to increase the traction surface when the nature of the work makes this desirable. Sufficient clearance is provided between the forward wheels to allow the vertical frame to oscillate and accommodate itself to inequalities of the ground over which the machine is moving.

In Figs. 7 and 8 we have illustrated in detail the manner of mounting the bracket 32 in the arch of the axle and have shown the bearing or pivot of the vertical frame in this bracket, and have also illustrated the preferred means for connecting the upper portion of the vertical frame to its pivot.

In Fig. 9 we have shown coiled springs 33 connecting the lower portion of the oscillating frame 2 with the brackets 13ª. These springs have the function of normally tending to hold the oscillating frame in a vertical position but allowing it to swing and maintain such position when the guide wheels are running over uneven ground. These springs have sufficient tension to normally center the vertical frame with respect to the guide wheels but allow their relative oscillation to compensate for any difference in level of the wheels. The main frame being suspended at the top and having its weight at the lower portion, will swing pendulum-like, the center of gravity being considerably below the pivotal point and where the nature of the ground permits, the guide wheels may follow an uneven surface, tilting up and down while the main frame remains vertical, swinging from side to side and always tilting toward the low side of the machine and throwing the weight toward the high side to counteract any tendency of the machine to overturn.

In Figs. 10 and 11 we have shown a slightly modified construction to adapt the machine for a shorter wheel base. This change consists in arranging the radiator 3ª of the engine in front of the forward axle instead of in the rear thereof, as shown in the previous figures. The forward axle is therefore set back of the forward end of the vertical frame, as shown clearly in Fig. 11, but the steering post and the worm connection therefor are in substantially the same relative position, as shown in the figures previously described.

As indicated in the general views, the machine may be operated from either end. The steering post 24 may have a hand wheel at each end and a seat for the driver may also be provided at each end, with a foot platform A adjacent thereto. The rear of the machine is equipped with the usual control levers B and C and a foot lever D controls the clutch between the engine and the transmission.

We claim as our invention:

1. A traction machine comprising a frame, a forward axle and guiding wheels, a rear axle and traction wheel, said frame having a horizontal pivotal bearing on said forward axle for lateral oscillation and a non-oscillating bearing on said rear axle, a source of motive power carried by the lower portion of said frame below said horizontal pivotal bearing and having driving connections with said traction wheel, the lower portion of said frame swinging toward the higher side of the machine to counteract the tendency to tip toward the lower side when traveling on a side hill.

2. A traction machine comprising a relatively deep and narrow frame, a forward axle and guiding wheels, a rear axle and traction wheel, said frame having a horizontal pivotal bearing on said forward axle for lateral oscillation and a non-oscillating bearing on said rear axle, a source of motive power carried by the lower portion of said frame below said horizontal pivotal bearing and having driving connections with said traction wheel, the lower portion of said frame swinging toward the higher side of the machine to counteract the tendency to tip toward the lower side when traveling on a side hill.

3. A tractor comprising a frame having upper and lower rails in a vertical plane, traction wheel upon opposite sides of said rails, a forward axle and guiding wheels and a pivotal connection between the upper rail of said frame and said axle.

4. A tractor comprising a frame having upper and lower rails in a vertical plane, traction wheels upon opposite sides of said rails, a forward axle and guiding wheels and a pivotal connection between the upper rail of said frame and said axle, and a source of motive power supported in said frame between said upper and lower rails and having a driving connection with said traction wheels.

5. A traction machine comprising a frame having upper and lower rails in a vertical plane, one above the other, a transmision casing interposed between the rear portions of said rails and rigidly secured thereto, traction wheels and an axle therefor journaled in said transmission casing, a source of motive power supported between said upper and lower rails and having a driving connection with said axle through said transmission casing, a forward axle and guiding wheels therefor, and a pivotal connection between said frame and said forward axle for oscillation of said frame laterally.

6. A traction machine comprising a frame arranged in a vertical plane, traction wheels supporting the rear portion of said frame, a forward axle and guiding wheels, means for oscillating said guiding wheels on a vertical axis to steer the machine, said frame having a horizontal pivotal connection with said axle for oscillation of said frame laterally, and guide rods pivotally connecting said axle with said frame, the pivot of said rods on said frame being concentric with the pivot of said frame on said axle.

7. A traction machine comprising a frame, a forward axle and guiding wheels, a rear axle and traction wheel, said frame having a horizontal pivotal bearing on said forward axle for lateral oscillation and a non-oscillating bearing on said rear axle, a source of motive power carried by the lower portion of said frame below said horizontal pivotal bearing and having driving connections with said traction wheel, the lower portion of said frame swinging toward the higher side of the machine to counteract the tendency to tip toward the lower side when traveling on a side hill, brace rods connected at their forward ends with said guiding wheels and having a pivotal connection with said frame concentric with its horizontal pivot on said forward axle.

8. A traction machine comprising a frame mounted in a vertical plane and having upper and lower substantially horizontal rails and a vertical end rail between them, a source of motive power and a transmission casing arranged between said upper and lower rails, traction wheels having bearings in said transmission casing and a driving connection through said casing with said source of motive power, a forward axle having an arched middle portion and a pivotal connection with the upper portion of said frame, guide wheels for said forward axle and means for oscillating said guide wheels to steer the machine.

9. A traction machine comprising a frame and a forward axle having an arched or raised middle portion, guide wheels having spindles mounted in vertical bearings in said axle, a rear axle and traction wheel, a frame having a horizontal pivot in the apex of said arched frame, a horizontal steering post having a bearing in said arched portion and operatively connected at its forward end with said wheel spindles and extending backwardly to a point in the rear of said traction wheel, and brace rods connected at their forward ends with said spindles and having their rear ends connected with the middle portion of said frame concentric with the pivot of said frame on said forward axle.

10. A tractor comprising a relatively deep and narrow frame arranged in a vertical plane, a forward axle and guide wheels, the upper portion of said frame having a horizontal pivotal connection with said axle for freedom of lateral oscillation between said guide wheels, and traction wheels mounted in the rear portion of said frame for oscillation therewith.

11. A tractor comprising a relatively deep and narrow frame arranged in a vertical plane, a forward axle and guide wheels, the upper portion of said frame having a horizontal pivotal connection with said axle for freedom of lateral oscillation between said guide wheels, source of motive power mounted in said frame below said pivotal connection and traction wheels mounted in the rear portion of said frame for oscillation therewith.

12. A tractor comprising a frame of relatively greater depth than width arranged in a vertical plane, an arched forward axle, brackets at the ends of said forward axle, guide wheels and spindles therefor having vertical bearings in said brackets, means rigidly connecting said spindles across the machine, said frame having a horizontal pivot in the apex of said arched axle, a steering post mounted on said frame and axle and having flexible connections with said wheel spindles, and a traction wheel mounted in the rear portion of said frame for lateral oscillation therewith.

13. A tractor comprising a frame arranged in a vertical plane, a forward axle and guide wheels, the upper portion of said frame having a horizontal pivotal connection with said axle for freedom of lateral oscillation between said guide wheels, a traction wheel mounted in the rear portion of said frame for oscillation therewith, and helical springs connecting the end portions of said axle with the forward portion of said frame and normally tending to center said frame between said guide wheels.

14. A traction machine comprising a frame, traction wheels supporting the rear portion of said frame, a forward axle and guiding wheels, means for oscillating said guiding wheels on a vertical axis to steer the machine, said frame having a horizontal pivotal connection with said axle for oscillation of said frame laterally, and guide rods pivotally connecting said axle with said frame, the pivot of said rods on said frame being concentric with the pivot of said frame on said axle.

15. A traction machine comprising a frame, a rear axle mounted therein, traction wheels for said axle, a forward axle and wheels therefor, said frame having a horizontal pivotal bearing on said forward axle for lateral oscillation and a non-oscillating bearing on said rear axle, a source of motive power carried by the lower forward portion of said frame below said horizontal pivotal bearing and having driving connections with said traction wheels, the lower forward portion of said frame swinging toward the higher side of the machine to counteract the tendency to tip toward the lower side when traveling on a side hill.

In witness whereof, we have hereunto set our hands this 26" day of October, 1918.

HAROLD NILSON.
LEONARD NILSON.